United States Patent
Yoo et al.

(10) Patent No.: US 9,261,958 B2
(45) Date of Patent: Feb. 16, 2016

(54) APPARATUS AND METHOD FOR NAVIGATION IN DIGITAL OBJECT USING GAZE INFORMATION OF USER

(75) Inventors: Byung In Yoo, Seoul (KR); Chang Kyu Choi, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1379 days.

(21) Appl. No.: 12/801,839

(22) Filed: Jun. 28, 2010

(65) Prior Publication Data

US 2011/0029918 A1 Feb. 3, 2011

(51) Int. Cl.
G06F 3/033 (2013.01)
G06F 3/01 (2006.01)

(52) U.S. Cl.
CPC .............. *G06F 3/013* (2013.01); *G06F 3/017* (2013.01)

(58) Field of Classification Search
CPC ................................. G06F 3/013; G06F 3/017
USPC .................................................. 715/800, 863
See application file for complete search history.

(56) References Cited

U.S. PATENT DOCUMENTS

| | | | | |
|---|---|---|---|---|
| 6,536,043 | B1* | 3/2003 | Guedalia | 725/90 |
| 6,577,329 | B1* | 6/2003 | Flickner et al. | 715/774 |
| 6,603,491 | B2* | 8/2003 | Lemelson et al. | 715/784 |
| 6,721,952 | B1* | 4/2004 | Guedalia et al. | 725/38 |
| 6,795,808 | B1* | 9/2004 | Strubbe et al. | 704/275 |
| 2001/0033287 | A1* | 10/2001 | Naegle et al. | 345/601 |
| 2002/0180799 | A1* | 12/2002 | Peck et al. | 345/784 |
| 2003/0106063 | A1* | 6/2003 | Guedalia | 725/90 |
| 2004/0070565 | A1* | 4/2004 | Nayar et al. | 345/156 |
| 2004/0100466 | A1* | 5/2004 | Deering | 345/428 |
| 2004/0104935 | A1* | 6/2004 | Williamson et al. | 345/757 |
| 2006/0112334 | A1* | 5/2006 | Endrikhovski et al. | 715/700 |
| 2006/0265651 | A1* | 11/2006 | Buck | 715/700 |
| 2007/0162922 | A1 | 7/2007 | Park | |
| 2008/0228577 | A1* | 9/2008 | Decre et al. | 705/14 |
| 2009/0089682 | A1* | 4/2009 | Baier et al. | 715/751 |
| 2009/0322678 | A1* | 12/2009 | Lashina et al. | 345/158 |
| 2010/0007601 | A1* | 1/2010 | Lashina et al. | 345/156 |
| 2010/0054526 | A1* | 3/2010 | Eckles | 382/100 |
| 2012/0105486 | A1* | 5/2012 | Lankford et al. | 345/661 |

FOREIGN PATENT DOCUMENTS

| | | |
|---|---|---|
| JP | 2005-130251 | 5/2005 |
| JP | 2006-202181 | 8/2006 |

(Continued)

OTHER PUBLICATIONS

Qing Luan et al., "Annotating Gigapixel Images", ACM UIST, 2008, 1-4 pages.
Johannes Kopf et al., "Capturing and Viewing Gigapixel Images", ACM Transaction on Graphics, 2007, 10 pages.

(Continued)

*Primary Examiner* — Stephen Hong
*Assistant Examiner* — Marshon Robinson
(74) *Attorney, Agent, or Firm* — NSIP Law

(57) ABSTRACT

A digital object navigation apparatus and method using gaze information of a user is provided. The digital object navigation apparatus may collect gaze information and gesture information of the user, may determine navigation information with respect to a digital object including a zoom rate, a rendering quality, or an intensity of an annotation, and may navigate in the digital object. The user may navigate in the digital object by only gazing without separate manipulation.

26 Claims, 14 Drawing Sheets

(56) References Cited

FOREIGN PATENT DOCUMENTS

| JP | 2007-274621 | 10/2007 |
| JP | 2008-003816 | 1/2008 |
| JP | 2008-40576 | 2/2008 |
| JP | 2008-129775 | 6/2008 |
| JP | 4162398 | 8/2008 |
| JP | 2008-244922 | 10/2008 |
| JP | 2009-20266 | 1/2009 |
| KR | 10-2004-0063153 A | 7/2004 |
| KR | 10-2005-0042399 | 5/2005 |
| KR | 10-2007-0116794 | 12/2007 |
| KR | 10-2008-0091547 A | 10/2008 |
| KR | 10-0885626 | 2/2009 |

OTHER PUBLICATIONS

Manu Kumar, "Gaze-Enhanced User Interface Design", Dissertation submitted to Stanford University for the degree of Doctor of Philosophy, May 2007.

Manu Kumar et al., "EyePoint: Practical Pointing and Selection Using Gaze and Keyboard" CHI: Conference on Human Factors in Computing Systems. San Jose, CA. 2007, 10 pages.

Aseem Agarwala et al., "Interactive Digital Photomontage", ACM SIGGRAPH '04, 1-9 pages.

Korean Office Action issued on Jul. 29, 2015 in counterpart Korean Application No. 10-2009-0069701 (8 pages with English translation).

* cited by examiner

FIG. 5
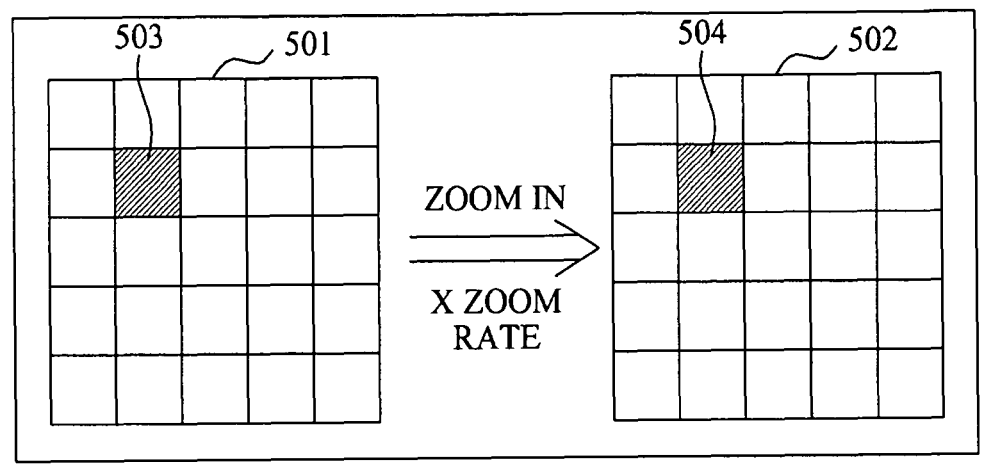
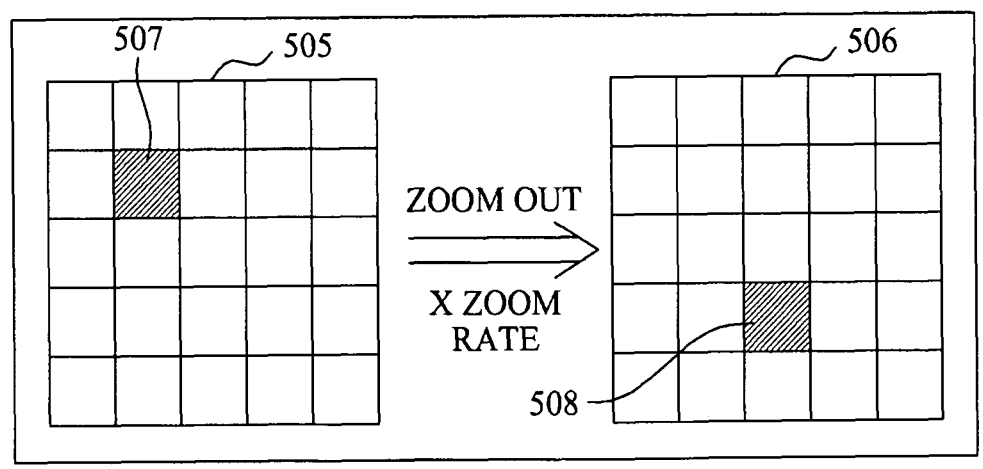

FIG. 7

| 1 | 1 | 1 | 1 | 1 | 0 |
|---|---|---|---|---|---|
| 1 | 2 | 2 | 2 | 1 | 0 |
| 1 | 2 | 3 | 2 | 1 | 0 |
| 1 | 2 | 2 | 2 | 1 | 0 |
| 1 | 1 | 1 | 1 | 1 | 0 |
| 0 | 0 | 0 | 0 | 0 | 0 |

FIG. 9
<DIGITAL OBJECT (DEPTH MAP)>
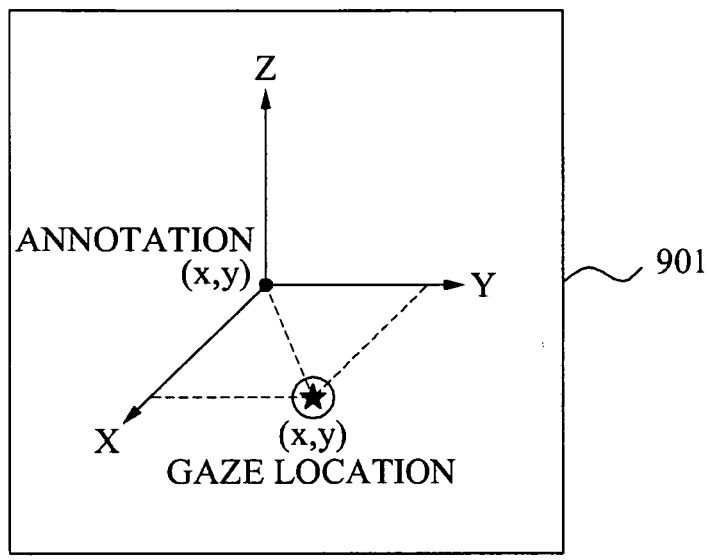
<HIT MAP>
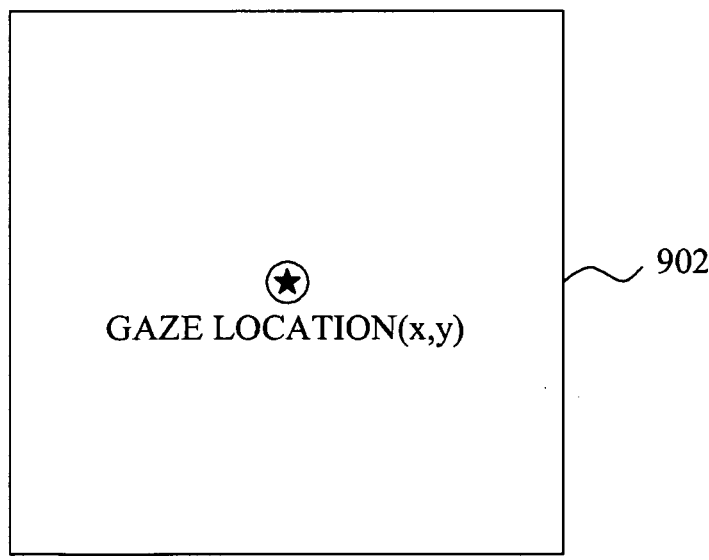

<BUBBLE STUCK UI>

APPARATUS AND METHOD FOR NAVIGATION IN DIGITAL OBJECT USING GAZE INFORMATION OF USER

CROSS-REFERENCE TO RELATED APPLICATION

This application claims the priority benefit of Korean Patent Application No. 10-2009-0069701, filed on Jul. 29, 2009, in the Korean Intellectual Property Office, the disclosure of which is incorporated herein by reference.

BACKGROUND

1. Field

Exemplary embodiments relate to a digital object navigation apparatus and method, and more particularly, to a digital object navigation apparatus and method that performs zoom-in/zoom-out based on gaze information of the user, performs quality rendering, and outputs an annotation.

2. Description of the Related Art

Recently, a frequency of utilizing a digital object, such as a picture, a motion image, a music and the like, increases along with development of digital devices. In general, a user may process the digital object by using a user interface, such as a keyboard, a mouse, and the like. However, it may be difficult to process the digital object in the case of a wall display to which the user is not able to input a command via the keyboard, the mouse, and the like. Also, in a case of a network-based digital TV, such as an Internet Protocol TV (IPTV), the user may have difficulty in utilizing an electronic program guide (EPG) and a widget for news, weather information, traffic information, financial information, and the like, from several hundreds of channels through a remote controller.

To overcome these difficulties, a method of tracing a motion of the user and reflecting the traced motion to adjust a real time output quality of the digital object has drawn a large amount of attention. However, a technology that effectively performs the method has not yet been developed.

SUMMARY

According to exemplary embodiments, there may be provided an apparatus for navigating in a digital object, including an information collecting unit to collect gaze information and gesture information of a user with respect to the digital object that includes a plurality of blocks, an information determining unit to determine navigation information with respect to the digital object by using the collected gaze information and the gesture information using at least one processor, and an object navigation unit to navigate in the digital object by using the navigation information with respect to the digital object.

Also, the information determining unit includes a zoom rate calculator to calculate a zoom rate with respect to the digital object by using the gaze information and the gesture information.

Also, the information determining unit includes a rendering quality calculator to calculate a rendering quality with respect to the digital object by using the gaze information and the gesture information.

Also, the information determining unit includes an annotation intensity calculator to calculate an intensity of an annotation with respect to the digital object by using the gaze information and the gesture information.

Also, the information determining unit includes a motion parallax calculator to calculate three-dimensional (3D) location information and rotation information of the digital object by using the gaze information and the gesture information.

According to exemplary embodiments, there may be provided a method of navigating in a digital object, including collecting gaze information and gesture information of a user with respect to a digital object that includes a plurality of blocks, determining navigation information with respect to the digital object by using the collected gaze information and gesture information, and navigating in the digital object by using the digital object, wherein the method may be performed using at least one processor.

According to another aspect of exemplary embodiments, there is provided at least one computer readable recording medium storing computer readable instructions to implement methods of the disclosure.

Additional aspects will be set forth in part in the description which follows and, in part, will be apparent from the description, or may be learned by practice of exemplary embodiments.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a diagram illustrating an example of navigating in a digital object by performing zoom-in/zoom-out with respect to the digital object according to exemplary embodiments;

FIG. 7 is a diagram illustrating an example of determining a rendering quality to be different for each block with respect to a digital object according to exemplary embodiments;

FIG. 9 is a diagram illustrating an example of calculating an intensity of an annotation based on a gaze location of a user according to exemplary embodiments;

DETAILED DESCRIPTION

Figure 1:
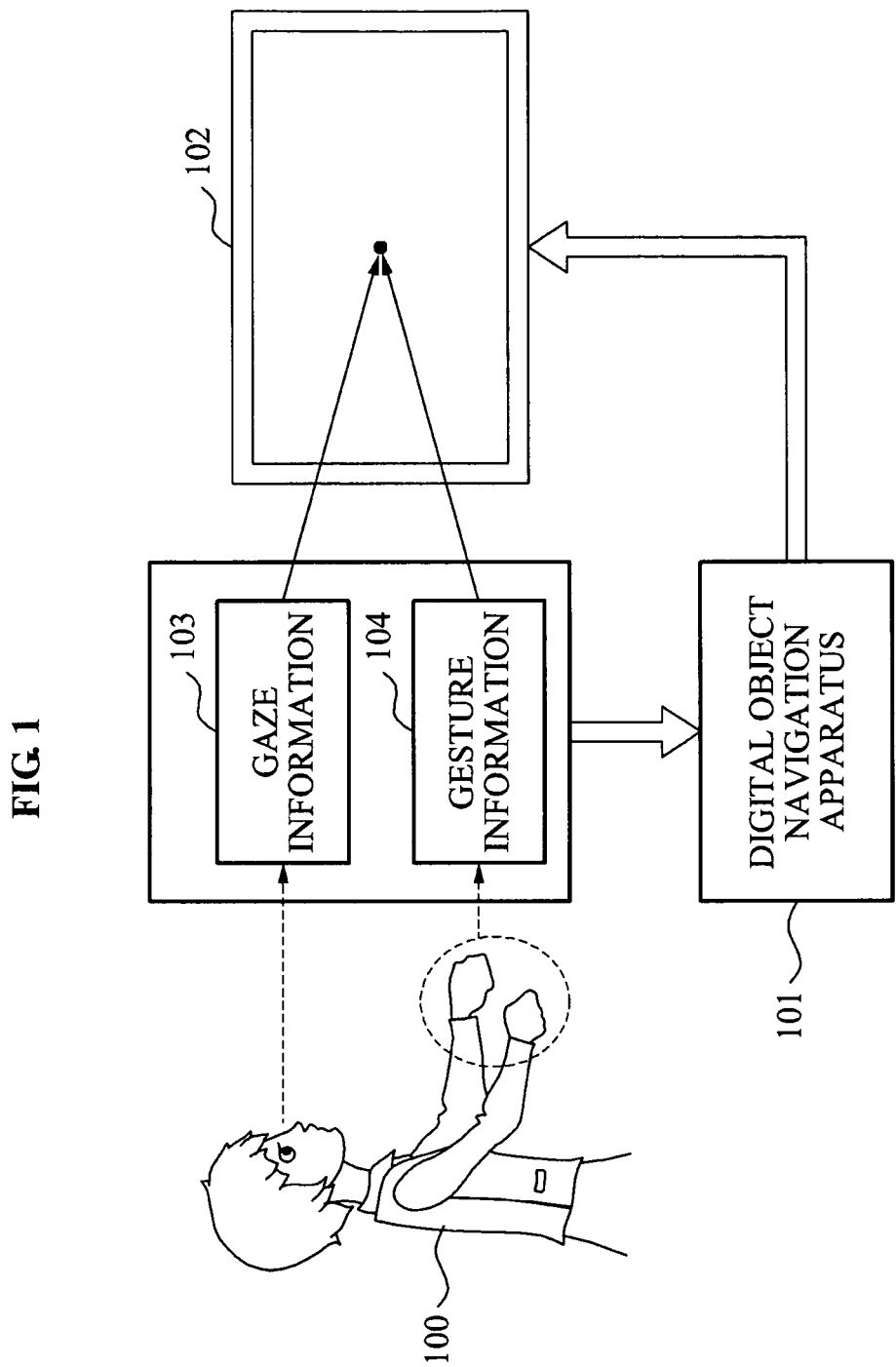
FIG. 1 is a diagram illustrating an operation of a digital object navigation apparatus according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

A digital object navigation method according to exemplary embodiments will be performed by a digital object navigation apparatus.

FIG. 1 is a diagram illustrating an operation of a digital object navigation apparatus according to exemplary embodiments.

The digital object navigation apparatus 101 according to an exemplary embodiment may trace gesture information 104, such as a hand motion, and gaze information 103 of a user 100 using various digital objects, such as a picture, a motion image, a music, and the like, thereby improving a quality of an output of a digital object around a gaze of the user. The user 100 may experience improved immersion and serviceability with respect to the digital object, and a load from processing the digital object may decrease. The digital object navigation apparatus 101 may exist inside or outside a display 102.

The digital object navigation apparatus 101 according to an exemplary embodiment may perform the following operations.

(1) Visual Attentive Zoomable User Interaction (ZUI)

When the user 100 plays the digital object, the digital object navigation apparatus 101 performs a zoom-in with respect to the digital object centering on a location the user 100 gazes at, and performs a zoom-out with respect to the digital object when the user 100 looks away.

(2) Visual Attentive Rendering

When the user 100 plays the digital object, the digital object navigation apparatus 101 performs rendering at the location the user 100 gazes at in a resolution having a high quality, and performs the rendering having a normal quality when the user 100 looks away. Also, when the user 100 plays a visualized music, a volume and a decoding quality of the digital object may increase at a location the user 100 gazes at, and the volume and the decoding quality of the digital object may decrease at the location, when the user 100 looks away.

(3) Visual Attentive Annotation

When the user 100 plays the digital object, the digital object navigation apparatus 100 may output annotation stored adjacent to the location the user 100 gazes at. As an example, the digital object navigation apparatus 100 may output the annotation stored adjacent to the location the user 100 gazes at, in a form of an image, an audio, and text.

(4) Motion Parallax User Interface (UI)

A view that is similar to when the user sees a real 3D object may be outputted by adjusting a location and a direction of a user interface object. Also, a view optimized for the user 100 may be provided by adjusting a projection of the UI to be outputted in a relatively small size and to be outputted in a relatively large size based on a location of the user 100. Also, when the user 100 sees a large-sized screen from a diagonal direction and a widget and the like is outputted on the large-sized screen on the other side of the user 100, the user 100 may have difficulty in having a broad view with respect to the widget, and thus, an output size of the UI may be based on the location of the user 100.

Figure 2:
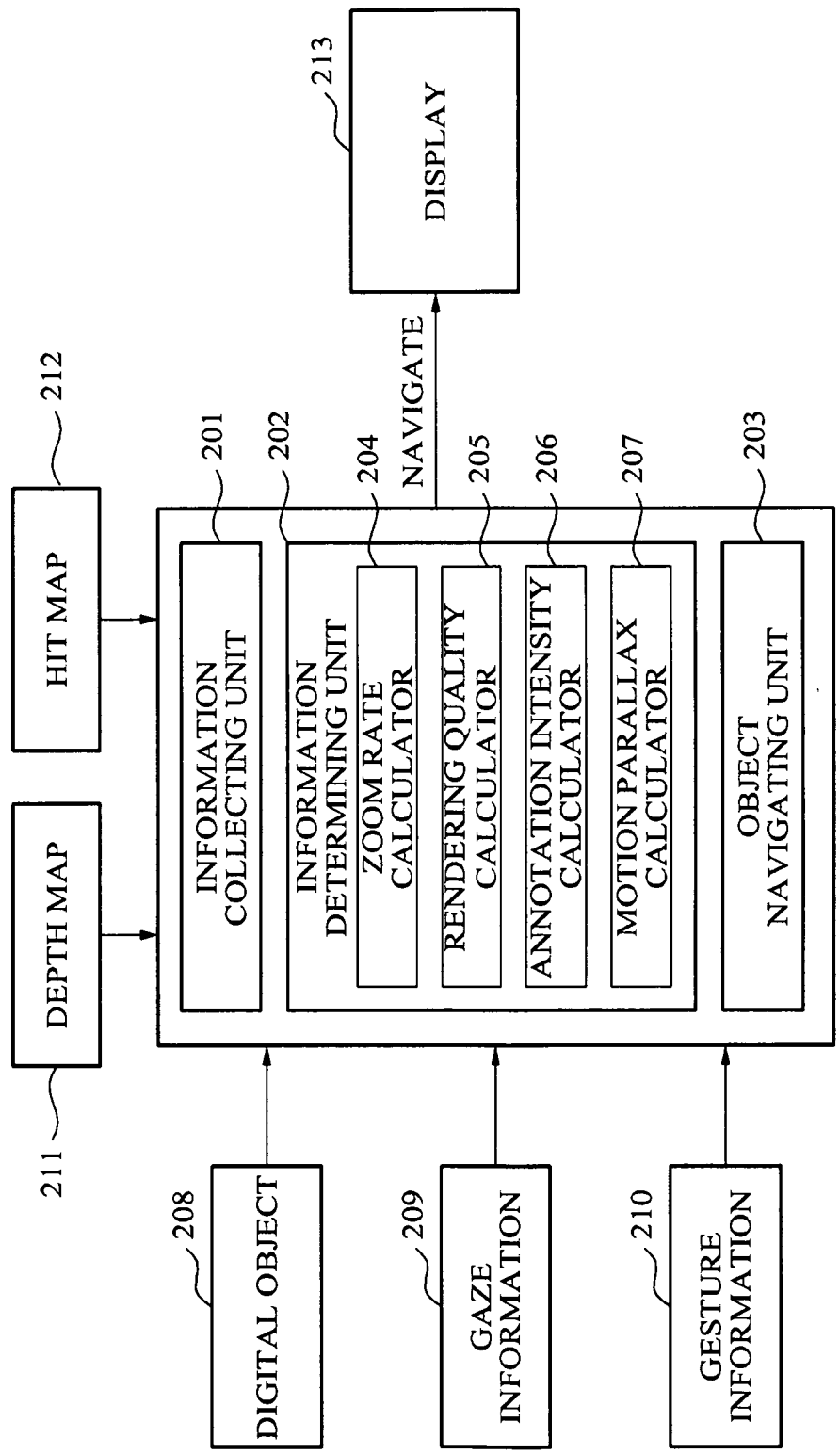
FIG. 2 is a block diagram illustrating a detailed configuration of a digital object navigation apparatus according to exemplary embodiments.

FIG. 2 is a block diagram illustrating a detailed configuration of a digital object navigation apparatus according to exemplary embodiments.

Referring to FIG. 2, a digital object navigation apparatus 101 may include an information collecting unit 201, an information determining unit 202, and an object navigation unit 203.

The information collecting unit 201 may collect gaze information 209 and gesture information 210 of the user with respect to a digital object 208. The gaze information may include a gaze location of the user on a two-dimensional (2D) screen, an eye-blink, location information of the user, and the like. In this instance, the digital object 208 may be divided into a plurality of blocks. When a gaze of the user is rapidly changed, errors in the gaze information 209 collected by the information collecting unit 201 may increase. Accordingly, the digital object navigation apparatus 101 may divide the digital object 208 into a plurality of blocks and may perform filtering of the gaze that minutely trembles, based on a block unit. Also, a block identification (ID) of a block may be allocated to each of the plurality of blocks.

The information determining unit 202 may determine navigation information with respect to the digital object 208 by using the collected gaze information 209 and the gesture information 210. As an example, the information determining unit 202 may include a zoom rate calculator 204, a rendering quality calculator 205, an annotation intensity calculator 206, and a motion parallax calculator 207.

The zoom rate calculator 204 may calculate a zoom rate with respect to the digital object 208 by using the gaze information 209 and the gesture information 210. In particular, the zoom rate calculator 204 may calculate a zoom rate with respect to a zoom-in or a zoom-out of the digital object 208 based on a block ID of a block included in the gaze information 209 and a continuous gaze time the user gazes at the block.

In this instance, when the block ID of the block that the user gazes at is the same during the continuous gaze time, the zoom rate calculator 204 may calculate the zoom rate with respect to the zoom-in of the digital object 208 by using the continuous gaze time. Also, when the block ID of the block that the user gazes at is changed during the continuous gaze time, the zoom rate calculator 204 may calculate the zoom rate with respect to the zoom-out of the digital object 208 by using the continuous gaze time.

As an example, the zoom rate calculator 204 may calculate the zoom rate with respect to the zoom-in of the digital object 208, when the continuous gaze time is greater than a predetermine threshold time.

The rendering quality calculator 205 may calculate a rendering quality with respect to the digital object 208 by using the gaze information 209 and the gesture information 210 of the user. As an example, the rendering quality calculator 205 may calculate the rendering quality of the digital object 208 based on the block ID of the block included in the gaze information and the continuous gaze time the user 100 gazes at the block. The rendering quality may be determined to be decreased centering on the location the user gazes at.

When the block ID of the block that the user gazes at is the same during the continuous gaze time, the rendering quality calculator 205 may calculate the rendering quality with respect to the digital object 208 by using the continuous gaze time. Conversely, the rendering quality calculator 205 may update the digital object 208 when the block ID of the block that the user gazes at is changed during the continuous gaze time.

Particularly, when the block ID of the block that the user gazes at is the same, the rendering quality calculator 205 may increase the rendering quality of the block that the user gazes at during the continuous gaze time, and may decrease the rendering quality with respect to blocks around the block that the user gazes at. In this instance, the quality calculator 205 may sequentially decrease rendering qualities of blocks around the block that the user gazes at.

The annotation information intensity calculator 206 may calculate an intensity of an annotation with respect to the digital object 208 by using the gaze information 209 and the gesture information 210. In this instance, the annotation may be in a form of a text, an audio, an image, and the like stored in a predetermined point of the digital object 208. As an example, the annotation intensity calculator 206 may calculate the intensity of the annotation with respect to the digital object 208 by using at least one of (a) a distance between the annotation and a gaze location that the user gazes at, (b) the gaze location the user gazes at on a depth map 211 and a distance of the gaze location, and (c) a distance of the gaze location on a hit map 212 that represents an interest of the user.

When at least one annotation is stored in the digital object 208, an annotation having a highest intensity may be outputted among annotations existing around the gaze location the user gazes at.

The motion parallax calculator 207 may calculate 3D location information and rotation information of the digital object by using the gaze information 209 and gesture information 210 of the user.

The object navigation unit 203 may navigate in the digital object 208 based on navigation information with respect to the digital object 208. As an example, when the digital object 208, such as an image, a motion image, and the like, is played on a display 213, the object navigation unit 203 may navigate in the played digital object based on the gaze information 208 of the user.

As an example, the object navigation unit 203 may perform a zoom-in/zoom-out with respect to the digital object 208 based on a zoom rate. Also, the object navigation unit 203 may change a rendering quality centering on the gaze location the user gazes at with respect to the digital object 208. Also, the object navigation unit 203 may navigate in the annotation centering on the gaze location the user gazes at, based on an intensity of the annotation. Also, the object navigation unit 203 may perform navigating in the digital object by changing an output location and an output angle of the digital object based on the location information and the gaze information 210 of the user.

Figure 3:
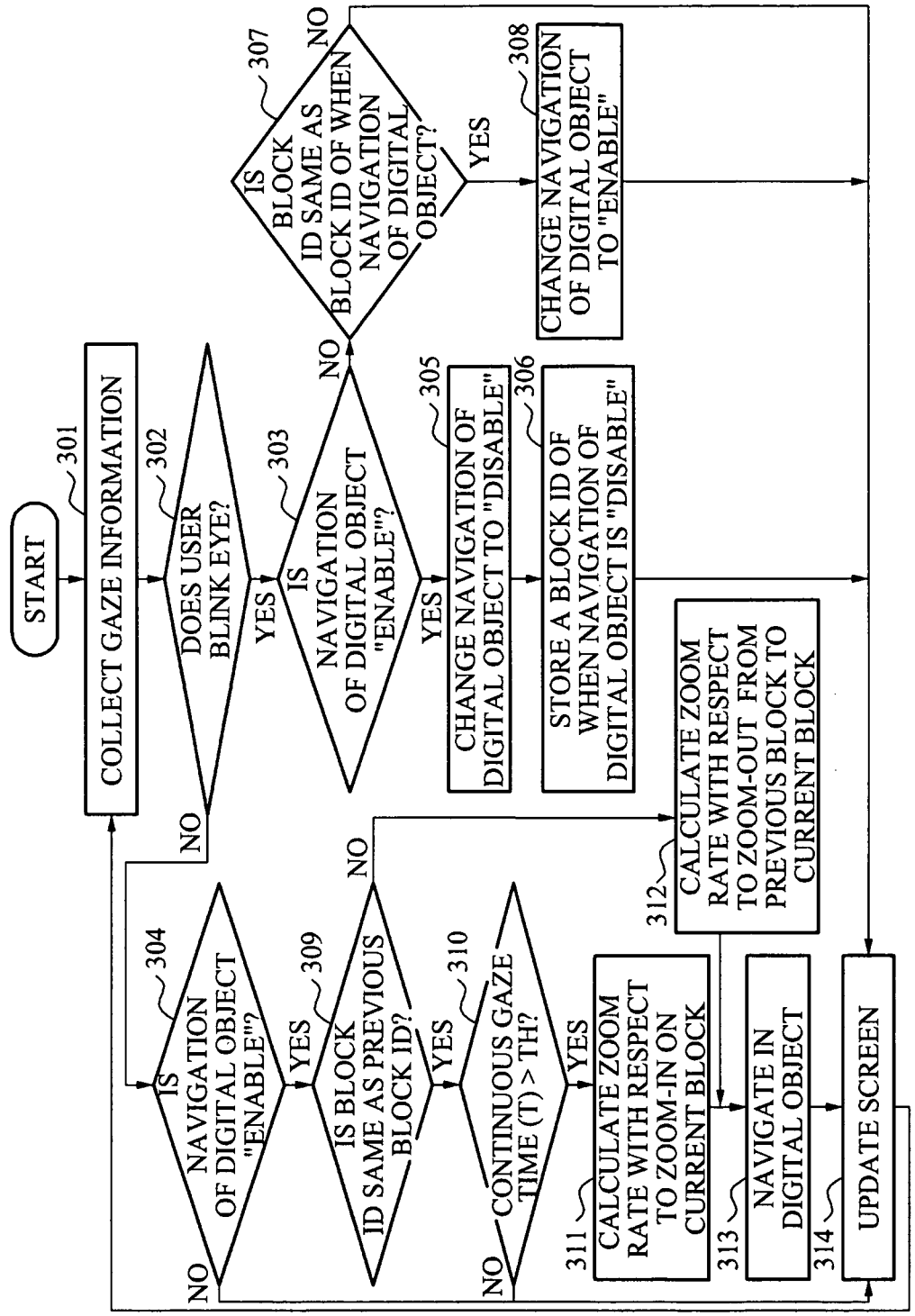
FIG. 3 is a flowchart illustrating an exemplary of performing a zoom-in/zoom-out with respect to a digital object based on gaze information according to exemplary embodiments.

FIG. 3 is a flowchart illustrating an example of performing a zoom-in/zoom-out with respect to a digital object based on gaze information according to exemplary embodiments.

The digital object navigation apparatus may collect gaze information in operation 301. Also, the digital object navigation apparatus may determine whether a user blinks his eye based on the gaze information in operation 302. In this instance, the eye-blink may be a standard for determining whether to hold or to release the navigation of the digital object.

When the user blinks, the digital object navigation apparatus may determine whether the navigation of the digital object prior to the eye-blink is "Enable" in operation 303. When the navigation of the digital object is not "Enable", the digital object navigation apparatus may determine whether a block ID is the same as a block ID of when the navigation of the digital object is "Disable" in operation 307.

When the block ID is the same, the digital object navigation apparatus may change the navigation of the digital object to be "Enable" in operation 308. Conversely, when the block ID is different, the digital object navigation apparatus may update a screen with respect to the digital object in operation 314. In this instance, the "Enable" indicates that the navigation of the digital object is performed, and the "Disable" indicates that the navigation of the digital object is on hold.

In operation 303, when the navigation of the digital object is "Enable", the digital object navigation apparatus may change the navigation of the digital object to be "Disable" in operation 305. Also, the digital object navigation apparatus may store a block ID of a block of when the navigation of the digital object is "Disable" in operation 306. In this instance, the block ID of the block relates to a block the user gazes at. Subsequently, the digital object navigation apparatus may update the screen with respect to the digital object in operation 314.

In operation 302, when the user does not blink his eye, the digital object navigation apparatus may determine whether the navigation of the digital object is "Enable" in operation 304. In this instance, when the navigation of the digital object is not "Enable", the digital object navigation apparatus may update the screen with respect to the digital object in operation 314. When the navigation of the digital object is "Enable", the digital object navigation apparatus may determine a current block the user currently gazes at is the same as a previous block where the user previously gazes at in operation 309.

In this instance, when a block ID of the current block and a block ID of the previous block are the same, the digital object navigation apparatus may determine a continuous gaze time (T) the user gazes at the current block is greater than a predetermined threshold time (Th) in operation 310. In operation 310, when the continuous gaze time (T) is less than or equal to the predetermined threshold time (Th), the digital object navigation apparatus may update the screen with respect to the digital object in operation 314.

Conversely, when the continuous gaze time (T) is greater than the predetermined threshold time (Th), the digital object navigation apparatus may calculate a zoom rate with respect to a zoom-in at the current block in operation 311. In operation 309, when the block ID of the current block and the block ID of the previous block are different from each other, the digital object navigation apparatus may calculate a zoom rate with respect to a zoom-out from the previous block to the current block in operation 312. In this instance, the zoom rate may be determined by using a zoom adjustment coefficient (K) and the continuous gaze time (T).

Then, the digital object navigation apparatus may navigate in the digital object based on the calculated zoom rate in operation 313, and may update the screen in operation 314. When the user continuously gazes at the current block, the digital object navigation apparatus may perform zoom-in, according to the zoom rate, centering on the current block during the continuous gaze time. Also, when the gaze of the user moves from the previous block to the current block, the digital object navigation apparatus may perform a zoom-out, according to the zoom rate, centering on the current block during the continuous gaze time.

After the screen is updated, the digital object navigation apparatus may return to operation 301 to collect gaze information again.

Figure 4:
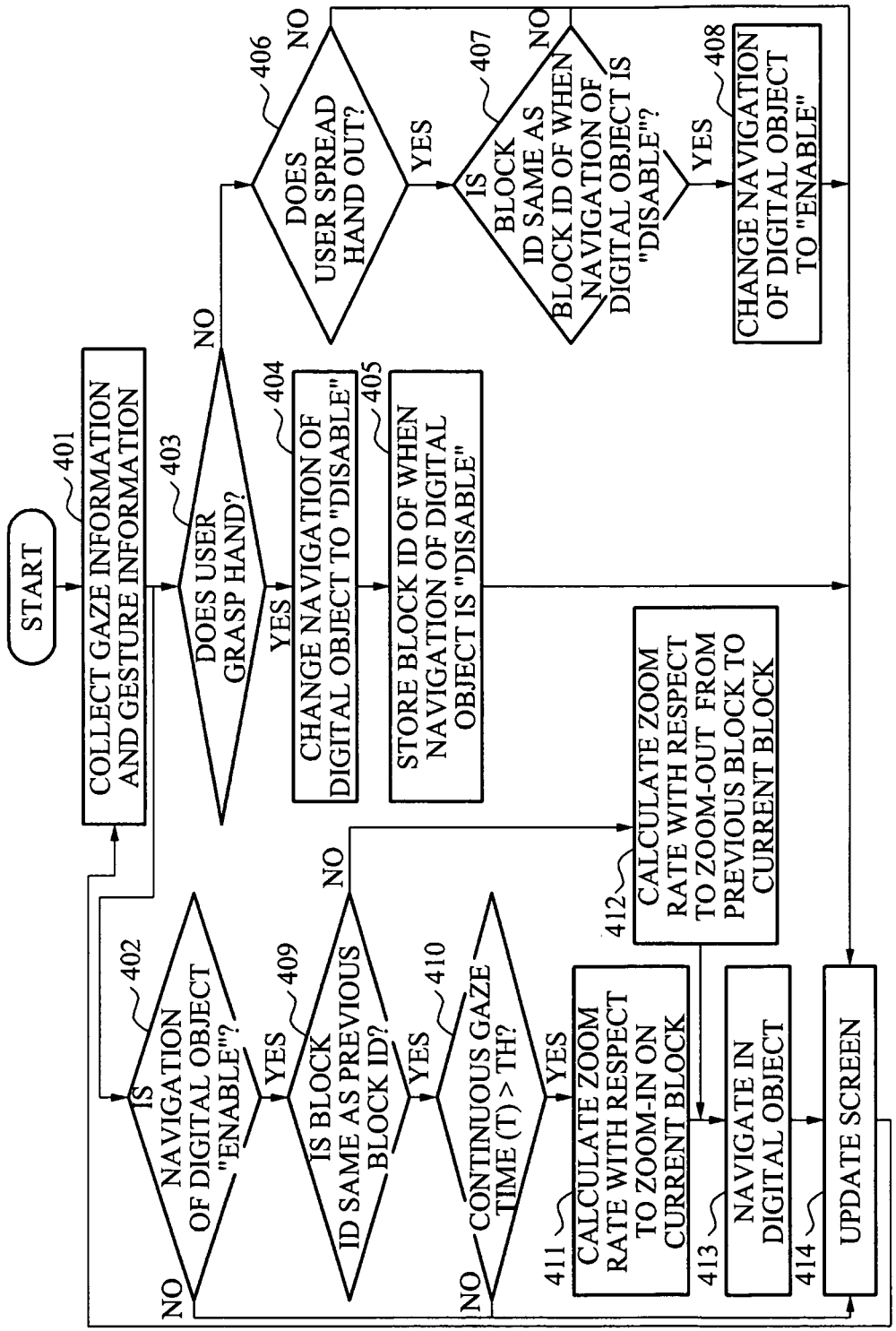
FIG. 4 is a flowchart illustrating an example of performing a zoom-in/zoom-out with respect to a digital object based on gaze information and gesture information according to exemplary embodiments.

FIG. 4 is a flowchart illustrating an example of performing a zoom-in/zoom-out with respect to a digital object based on gaze information and gesture information according to exemplary embodiments.

In this instance, the illustration of FIG. 3 describes an operation of determining whether to perform navigation of the digital object based on gaze information of the user, and an operation of performing zoom-in/zoom-out based on the gaze information of the user. Also, the illustration of FIG. 4 describes an operation of determining whether to perform the navigation of the digital object based on gesture information, and an operation of performing zoom-in/zoom-out based on the gaze information of the user.

The digital object navigation apparatus may collect the gaze information and the gesture information in operation 401. In this instance, the gesture information may include a hand motion of the user. The digital object navigation apparatus may determine whether the user grasps his hand based on the gesture information in operation 403. When the user grasps his hand, the digital object navigation apparatus may change the navigation of the digital object to be "Disable" in operation 404.

When the user does not grasp the hand, the digital object navigation apparatus may determine whether the user spreads his hand out in operation 406. When the user spread his hand out, whether a block ID of a block the user gazes at is the same as a block ID of a block of when the navigation of the digital object is "Disable" may be determined in operation 407. When the block ID is the same, the digital object navigation apparatus may change the navigation of the digital object to be "Enable" in operation 408. The remaining operations 402, 405, and 409 through 414 may be understood based on the illustration of FIG. 3.

Accordingly, the digital object navigation apparatus may determine whether to perform or to hold the navigation of the digital object based on the eye-blink or the hand motion about whether the user grasps his hand or spreads his hand out.

According to an exemplary embodiment, the gesture of the hand may not be limited to grasping or spreading the hand, and may be changed to be various motions. Also, according to an exemplary embodiment, the gesture is not limited in the hand and may include gestures of other parts of a body of the user.

FIG. 5 is a diagram illustrating an example of navigating in a digital object by performing zoom-in/zoom-out with respect to the digital object according to exemplary embodiments.

FIG. 5 illustrates that the navigating in the digital object is "Enable" by an eye-blink or a hand motion. When the navigation of the digital object is "Disable", the operation illustrated in FIG. 5 may be performed only after the navigation of the digital object becomes "Enable" by the eye-blink or the hand motion of the user.

Zoom In

A frame 501 and a frame 502 provide the same digital object. It is assumed that the user gazes at a block 503 of a frame 501 that is divided into a plurality of blocks, at a time T1. Also, it is assumed that the gaze of the user is located in a block 504 that is located at the same location as the block 503 of the frame 501 at a time T2 after a predetermined time passes. The block 503 and the block 504 indicate the same block ID.

When a continuous gaze time of the user is greater than a predetermined threshold time, the digital object navigation apparatus may calculate a zoom rate by using a zoom adjustment coefficient and the continuous gaze time. Then, the digital object navigation apparatus may perform a zoom-in centering on the block 504 of a frame 502 based on the zoom rate. Therefore, an image or a motion image displayed on the frame 502 may be magnified centering on the block 504.

Zoom Out

A frame 505 and a frame 506 provide the same digital object. It is assumed that the user gazes at a block 507 of the frame 505 that is divided into a plurality of blocks, at a time T1. Also, it is assumed that the gaze of the user is located in a block 508 of the frame 506 at a time T2 after a predetermined time passes.

Then, the digital object navigation apparatus may calculate a zoom rate by using a continuous gaze time and a zoom adjustment coefficient. In this instance, the continuous gaze time may indicate a time when the gaze moves from the block 507 to the block 508. Thereafter, the digital object navigation apparatus may perform a zoom-out from the block 507 of the frame 505 to the block 508 of the frame 506 based on the zoom rate. Then, zooming out of an image or a motion image displayed during a progress from the frame 505 to the frame 506 may be performed.

Figure 6:
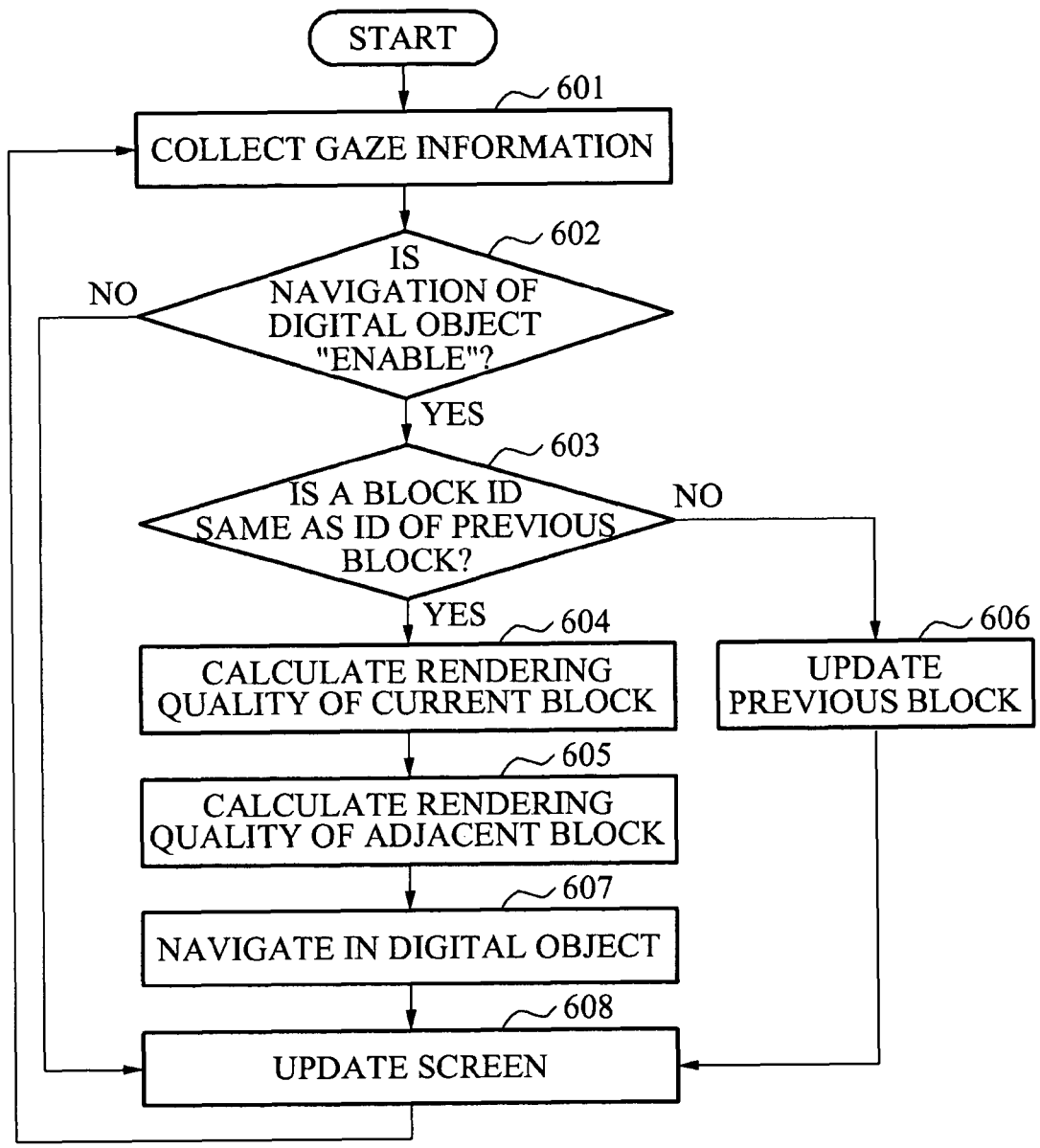
FIG. 6 is a flowchart illustrating an example of navigating in a digital object by applying a different rendering quality for each block, based on gaze information according to exemplary embodiments.

FIG. 6 is a flowchart illustrating an example of navigating in a digital object by applying a different rendering quality for each block, based on gaze information according to exemplary embodiments.

A digital object navigation apparatus may collect gaze information of a user in operation 601. Also, the digital object navigation apparatus may determine whether the navigation of the digital object is "Enable" in operation 602. When the navigation of the digital object is "Disable", the digital object navigation apparatus may update a screen in operation 608.

When the navigation of the digital object is "Enable", the digital object navigation apparatus may determine whether a block ID of a block the user gazes at is the same as a block ID of a previous block in operation 603. When the ID of the block is not the same, the digital object navigation apparatus may update the previous block the user gazes at in operation 606. That is, a resolution of the previous block and the like may be restored to its original state.

Also, when the block ID of the block is the same, the digital object navigation apparatus may calculate a rendering quality of a current block the user gazes at in operation 604. Also, the digital object navigation apparatus may calculate a rendering quality of blocks around the current block in operation 605. In this instance, a rendering quality of the current block may be greater than the rendering quality of the blocks around the current block. As an example, the rendering quality may be determined based on a continuous gaze time and a rendering adjustment coefficient.

When the rendering quality is calculated, the digital object navigation apparatus may navigate in the digital object in operation 607. Subsequently, the digital object navigation apparatus may update the screen with respect to the digital object.

FIG. 7 is a diagram illustrating an example of determining a rendering quality to be different for each block with respect to a digital object according to exemplary embodiments.

FIG. 7 illustrates a single frame among a plurality of frames constituting the digital object. In this instance, the single frame may be divided into a plurality of blocks. When a user gazes at a block among the plurality of blocks, the digital object navigation apparatus may increase a rendering quality of the block. That is, a quality of the block, such as a resolution, a sound quality, a volume, and the like, may be increased. Also, rendering qualities of blocks around the block the user gazes at may progressively decrease.

A block including "3" of the FIG. 7 indicates a block the user currently gazes at. In this instance, "3" indicates a rendering quality. Therefore, the digital object navigation apparatus may progressively decrease the rendering quality of blocks around the block user gazes at. That is, the quality is improved centered on the block the user gazes at, and the user may experience feeling immersed in the digital object centered on the block the user gazes at.

Figure 8:
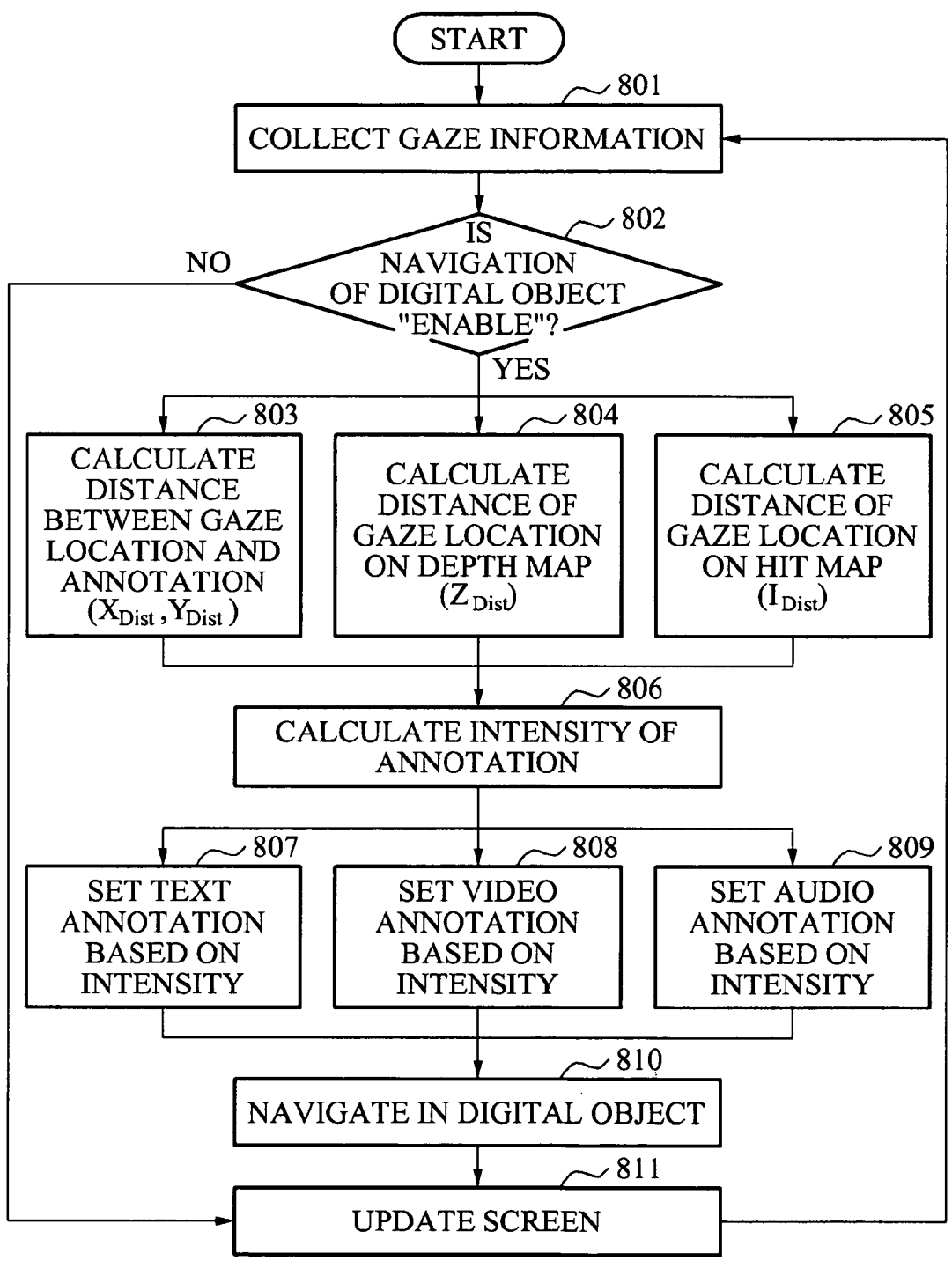
FIG. 8 is a flowchart illustrating an example of navigating in a digital object by calculating an intensity of an annotation with respect to the digital object based on gaze information according to exemplary embodiments.

FIG. 8 is a flowchart illustrating an example of navigating in a digital object by calculating an intensity of annotation with respect to the digital object based on gaze information according to exemplary embodiments.

The digital object navigation apparatus may collect gaze information of a user in operation 801. Subsequently, the digital object navigation apparatus may determine whether the navigation of the digital object is "Enable" in operation 802. When the navigation of the digital object is "Disable", the digital object navigation apparatus may update a screen in operation 811.

Conversely, when the navigation of the digital object is "Enable", the digital object navigation apparatus may calculate a distance ($X_{Dist}$, $Y_{Dist}$) between a gaze location of the user and an annotation in operation 803. Also, the digital object navigation apparatus may calculate a distance ($D_{Dist}$) of the gaze location of the user on a depth map in operation 804. In this instance, the depth map may be a map representing a distance between the user and components included in the digital object. Also, the digital object navigation apparatus may calculate a distance ($I_{Dist}$) of the gaze location of the user on a hit map in operation 805. In this instance, the hit map may be a map representing a region the user is interested in.

Subsequently, the digital object navigation apparatus may calculate an intensity of the annotation by using the calculated distance in operation 806. In this instance, the intensity of the annotation may be a standard for determining an annotation to be displayed with respect to the digital object, among at least one of annotation stored in the digital object.

The digital object navigation apparatus may set a text annotation based on the intensity of the annotation in operation 807, may set a video annotation in operation 808, or may set an audio annotation in operation 809. As an example, in a case of a text, the digital object navigation apparatus may adjust a size, a font, or a color of the text. Also, in a case of a video, the digital object navigation apparatus may adjust a size, a resolution, and a volume of the video. Also, in a case of an audio, the digital object navigation apparatus may adjust an audio volume and a frequency rate.

The digital object navigation apparatus may display the annotation by navigating in the digital object in operation 810. Subsequently, the digital object navigation apparatus may update the screen in operation 811.

FIG. 9 is a diagram illustrating an example of calculating an intensity of annotation based on a gaze location of a user according to exemplary embodiments.

The digital object navigation apparatus may calculate a distance (XDist, YDist) between the gaze location of the user and the annotation on a digital object 901. Also, the digital object navigation apparatus may calculate a distance (DDist) of the gaze location of the user on a depth map with respect to the digital object 901. In this instance, the depth map may indicate a map representing a distance between the user and components included in the digital object.

As an example, the digital object navigation apparatus may calculate the distance (XDist, YDist) between the gaze location of the user and the annotation based on Equation 1. Also, the digital object navigation apparatus may calculate the distance (DDist) between the gaze location of the user on the depth map with respect to the digital object 901 based on Equation 2.

$$X_{Dis}=|AnnotX-CurX|, YDist=|AnnotY-CurY| \quad \text{[Equation 1]}$$

In this instance, Annot X and Annot Y indicate X and Y components of the annotation, respectively. Also, CurX and CurY indicate X and Y components of the gaze location of the user, respectively.

$$D_{Dist}=|\text{Depth Map}(x,y)-CurZ| \quad \text{[Equation 2]}$$

In this instance, Depth Map(x,y) indicates components of the annotation on the depth map, and CurZ indicates the gaze location of the user on the depth map. In this instance, the CurZ may be a value that a zoom rate is applied to.

Also, the digital object navigation apparatus may calculate a distance (IDist) of the gaze location of the user on a hit map 902. In this instance, the hit map may indicate a map representing a region the user is interested in. As an example, the digital object navigation apparatus may calculate the distance (IDist) of the gaze location of the user on the hit map 902 based on Equation 3.

$$I_{Dist}=|\text{HitMap}(x,y)| \quad \text{[Equation 3]}$$

As an example, the intensity (D) of the annotation may be determined based on Equation 4.

$$D = \sqrt{X_{Dist}^2 + Y_{Dist}^2 + D_{Dist}^2 + I_{Dist}^2} \quad \text{[Equation 4]}$$

Figure 10:
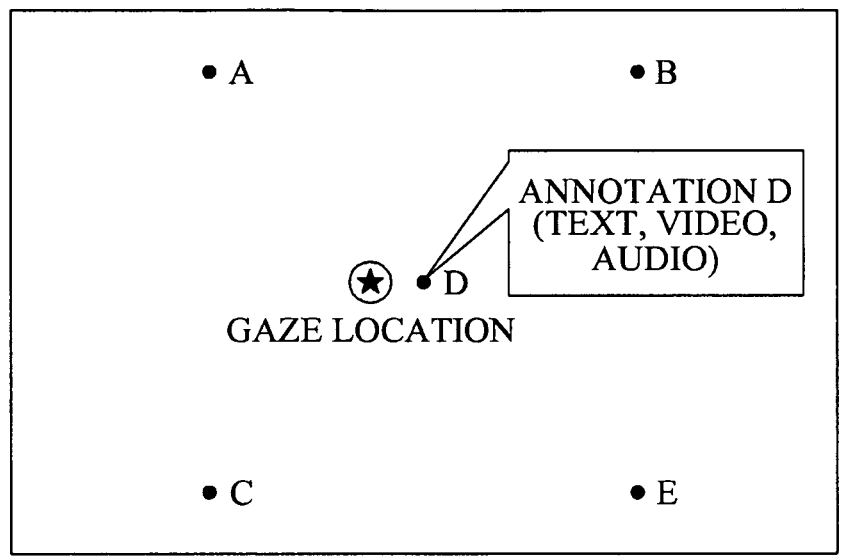
FIG. 10 is a diagram illustrating an example of displaying an annotation based on a gaze location of a user according to exemplary embodiments.

FIG. 10 is a diagram illustrating an example of displaying annotation based on a gaze location of a user according to exemplary embodiments.

Referring to FIG. 10, it is assumed that annotations are stored in A, B, C, D, and E of the digital object. In this instance, when the gaze location of the user exists on a predetermined point of the digital object, the digital object navigation apparatus may calculate the intensity of the annotation centering on the gaze location of the user. The intensity of the annotation may be determined based on Equations 1, 2, 3, and 4 of FIG. 9. That is, the intensity of the annotation relates to a distance between a location of a annotation stored in advance and a distance of the gaze location of the user.

An intensity of an annotation stored in D which is closest to the gaze location of the user may be determined to be a highest intensity. Then, the annotation stored in D may be displayed in a form of a text, a video, or an audio. As an example, when the digital object is a map, the digital object navigation apparatus may display detailed information about D which is a restaurant closest to the gaze location of the user, in a form of a text, an audio, and a video. Accordingly, the user may obtain the annotation stored in advance by merely gazing at a predetermined point of the digital object.

Figure 11:
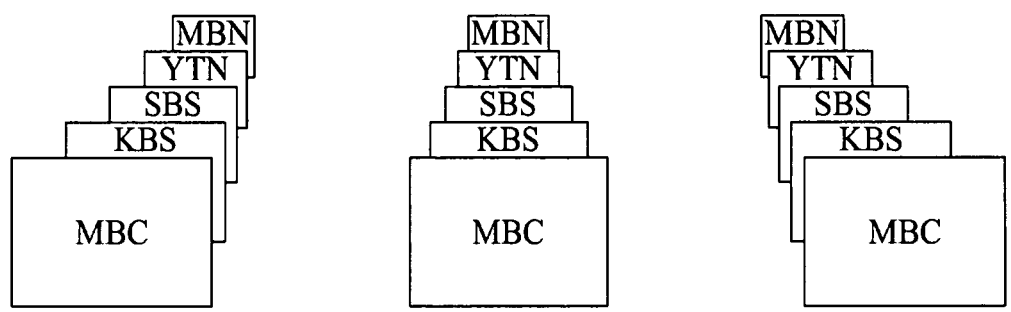
FIG. 11 is a diagram illustrating an example of navigating in channels based on a gaze location of a user according to exemplary embodiments.

FIG. 11 is a diagram illustrating an example of navigating in a channels based on a gaze location of a user according to exemplary embodiments Referring to FIG. 11, an operation of changing channels that are three-dimensional (3D) digital objects based on gaze of user. That is, according to exemplary embodiments, 3D location information and rotation information of the digital object may be calculated by using the gaze information and gesture information of the user. Then, the 3D location information and rotation information of the digital object are determined centering on the gaze location the user gazes at, and thereby navigating in the digital object.

Referring to FIG. 11, the user may navigate in a plurality of channels by only gazing from a current location without a separate operating device, such as a remote controller and the like. In FIG. 11, when the user gazes at a left side of a screen, the plurality of channels may be displayed on a location the user gazes at. Also, when the user moves his gaze from the left side to a right side of the screen, the channels displayed on the screen move according to the gaze of the user.

Figure 12:
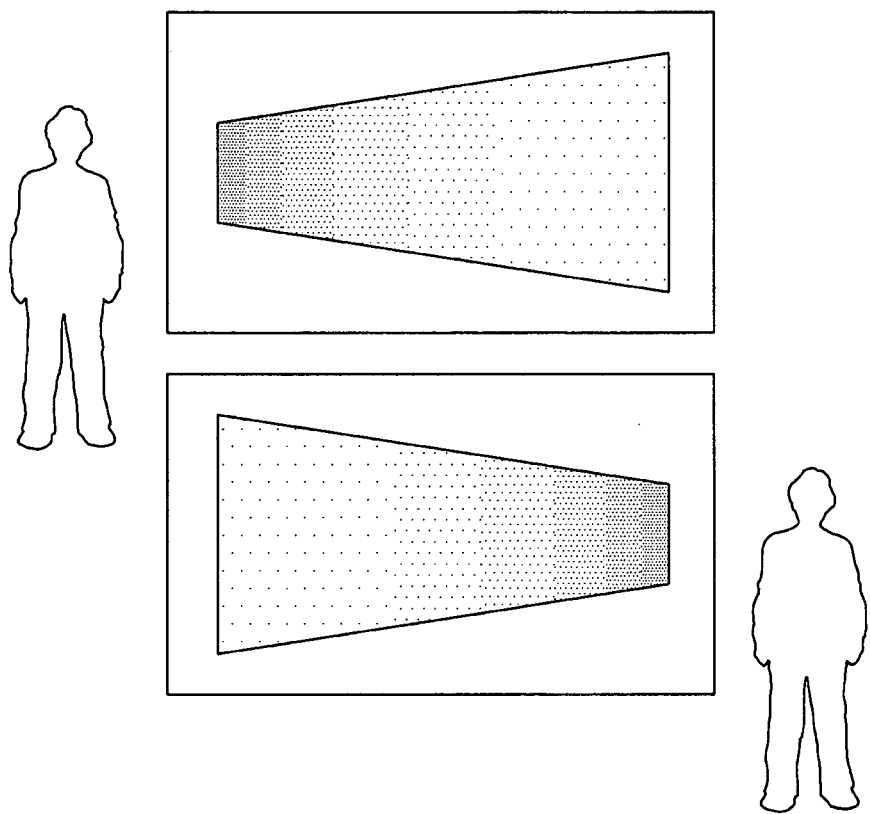
FIG. 12 is a diagram illustrating an example of determining a user interface (UI) to be different based on a location of a user according to exemplary embodiments.

FIG. 12 is a diagram illustrating an example of determining a UI to be different based on a location of a user according to exemplary embodiments.

Referring to FIG. 12, a digital object displayed on a screen is adjusted and is outputted to be large in a direction of the user and to be small in an opposite direction of the user. Particularly, in a case of a large-sized screen, a digital object far away from the user may be displayed to be larger than when the digital object is close to the user since it is hard to recognize the digital object that is small and far from the user.

Accordingly, the digital object navigation apparatus may adjust a projection of the UI to change a location and a rotation attribute of the digital object, and may output the digital object to be large in a direction of the user and to be small in an opposite direction of the user, thereby providing a view optimized for the user. That is, referring to FIG. 12, a perspective view may be provided depending on a location of the user.

Figure 13:
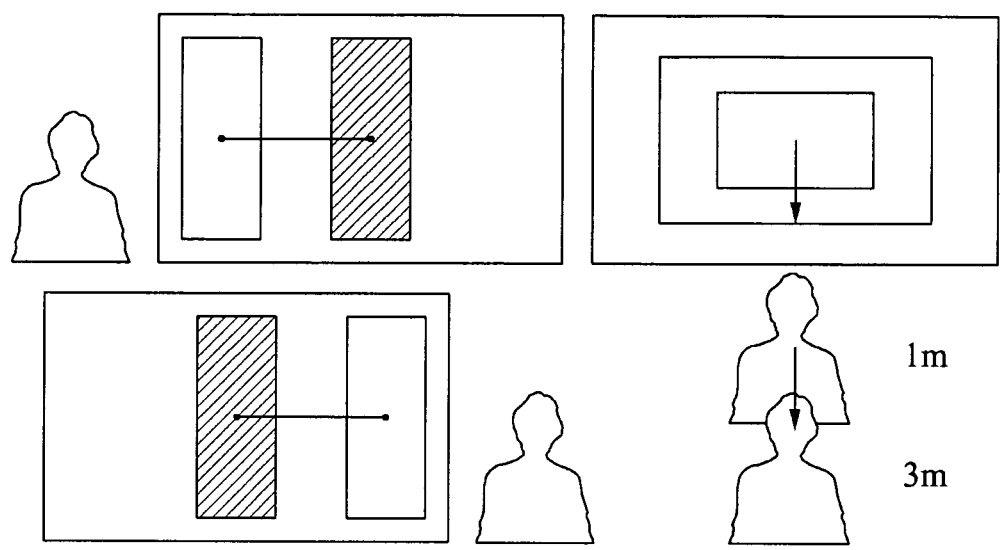
FIG. 13 is a diagram illustrating an example of outputting an UI based on a location of a user according to exemplary embodiments.

FIG. 13 is a diagram illustrating an example of outputting a UI based on a location of a user according to exemplary embodiments Referring to FIG. 13, the digital object may be outputted based on the location of the user. That is, when the user is located in a left side of a screen, the outputted digital object moves to the left side, and when the user is located in a right side of the screen, the outputted digital object moves to the right side.

Particularly, in a case of large-sized screen, when the user sees the screen from a diagonal direction, the user may have difficulty in recognizing the digital object, and thus, the digital object navigation apparatus according to an exemplary embodiment may move and output the digital object according to location information of the user. Also, when a distance between the user and the screen increases, the digital object displayed on the screen may be magnified in proportion to the increased distance and may be displayed. These methods may be included in a UI referred to as "bubble stuck".

Figure 14:
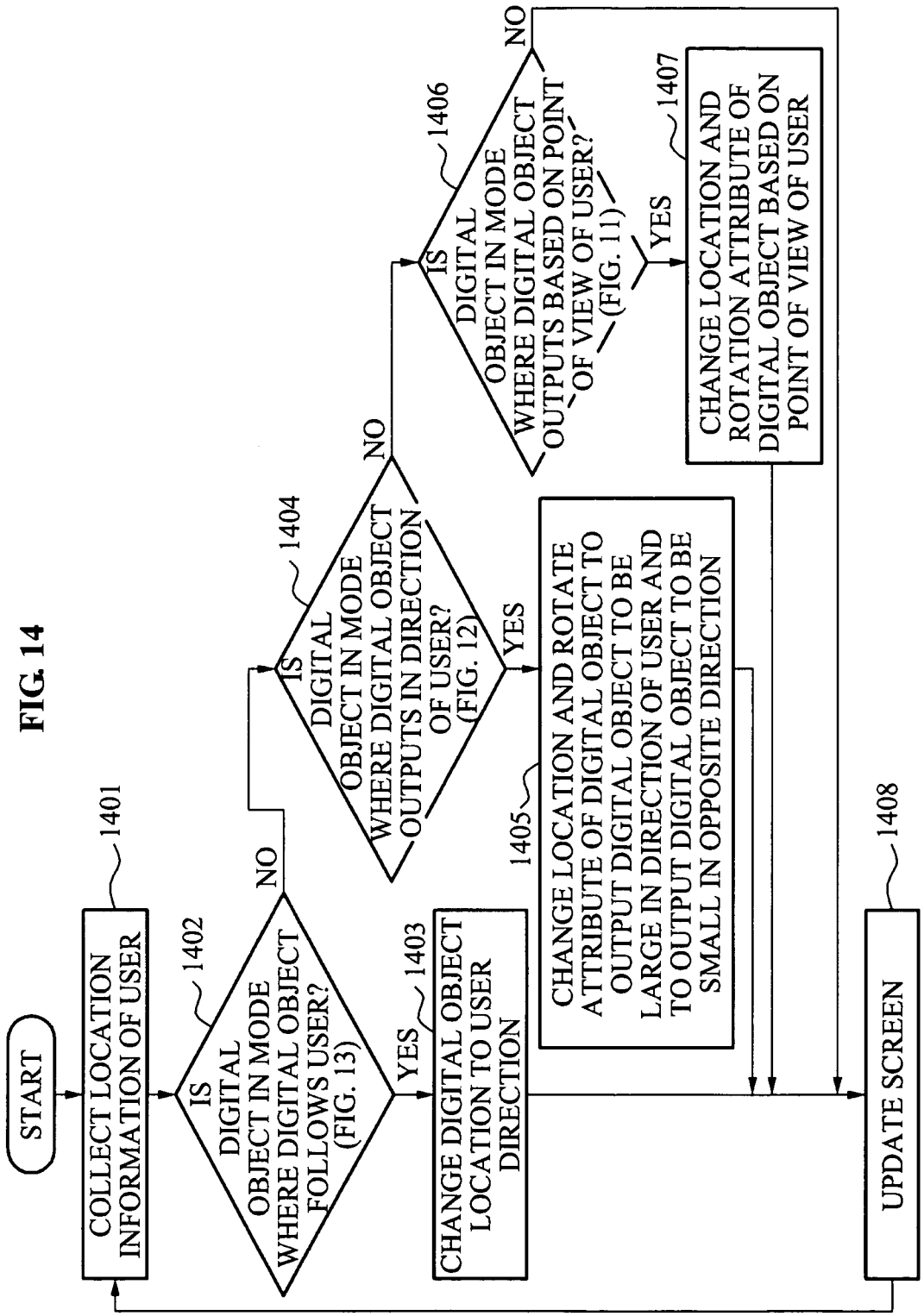
FIG. 14 is a flowchart illustrating an example of changing an output location and an output angle of a digital object based on location information and gaze information of a user according to exemplary embodiments.

FIG. 14 is a flowchart illustrating an example of changing an output location and an output angle of a digital object based on location information and gaze information of a user according to exemplary embodiments.

A digital object navigation apparatus may collect location information of the user in operation 1401. In this instance, the digital object navigation apparatus may determine whether the digital object is in a mode (first mode) where the digital object follows the user as illustrated in FIG. 13 in operation 1402. When the digital object is in the first mode, the digital object navigation apparatus may change a location of the digital object according to the location of the user in operation 1403.

Conversely, when the digital object is not in the first mode, the digital object navigation apparatus may determine whether the digital object is in a second mode where the digital object is outputted in a direction of the user in operation 1404. When the digital object is in the second mode, the digital object navigation apparatus may change the location and a rotation attribute of the digital object to be outputted to be large in the direction of the user and to be small in an opposite direction of the user in operation 1405.

When the digital object is not in the second mode, the digital object navigation apparatus may determined whether the digital object is in a third mode where the digital object is outputted according to a gaze of the user in operation 1406. When the digital object is in the third mode, the digital object navigation apparatus may change the location and rotation attribute of the digital object that is displayed on the screen according to a point of view based on the gaze of the user in operation 1407. Otherwise, when the digital object is not in the third mode, the screen where the digital object is displayed may be updated in operation 1408.

After being processed through operations 1403, 1405, and 1407, the screen where the digital object is displayed may be updated in operation 1408.

The method of navigating in the digital object according to the above-described exemplary embodiments may be recorded in a computer readable medium or computer-readable media including program instructions to implement various operations embodied by a computer. The medium or media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described exemplary embodiments, or vice versa.

According to an exemplary embodiment, a zoom rate with respect to a zoom-in/zoom-out is determined based on gaze information and gesture information of the user to navigate in a digital object, and thus, Zoomable User Interaction (ZUI), which is natural, may be provided without additional separate device.

According to an exemplary embodiment, a rendering quality is improved centering on a current block based on gaze information of a user, thereby increasing an output quality of the digital object around the gaze of the user, and improving immersion and serviceability with respect to the digital object.

According to an exemplary embodiment, annotation stored in advance is provided to a digital object by using gaze information, thereby obtaining information about components represented by the digital object without an additional separate device.

According to an exemplary embodiment, a location of an object, such as a channel and a widget, is adjusted and outputted according to gaze information of a user, or a view optimized to the user is provided by outputting an object close to the user to be small and an object far from the user to be large. Also, according to an exemplary embodiment, a UI outputs an object by following a location of a user since the user has difficulty in obtaining a broad view when the user views a large-sized screen from a diagonal direction.

Although a few exemplary embodiments have been shown and described, it would be appreciated by those skilled in the art that changes may be made in these exemplary embodiments without departing from the principles and spirit of the present disclosure, the scope of which is defined in the claims and their equivalents.

What is claimed is:

1. An apparatus configured to navigate in a digital object, comprising:
    an information collecting unit configured to collect gaze information and gesture information of a user with respect to the digital object that includes blocks;
    an information determining unit configured to determine navigation information with respect to the digital object by using the collected gaze information and the gesture information using at least one processor; and
    an object navigation unit configured to navigate in the digital object by using the navigation information with respect to the digital object, wherein the information determining unit comprises an annotation intensity calculator configured to calculate an intensity of an annotation or the information determining unit comprises a motion parallax calculator configured to calculate three-dimensional (3D) location information and rotation information of the digital object.

2. The apparatus of claim 1, wherein:
    the information determining unit comprises a zoom rate calculator to calculate a zoom rate with respect to the digital object by using the gaze information and the gesture information; and
    the object navigation unit navigates in the digital object centering on a block the user gazes at, based on the zoom rate.

3. The apparatus of claim 2, wherein the zoom rate calculator calculates a zoom rate with respect to a zoom-in or a zoom-out of the digital object based on a block identification (ID) of a block included in the gaze information and a continuous gaze time the user gazes at the block.

4. The apparatus of claim 3, wherein the zoom rate calculating unit performs one of:
    calculating of the zoom-in of the digital object by using the continuous gaze time, when the block identification (ID) of the block the user gazes at is the same during the continuous gaze time; and
    calculating of the zoom-out of the digital object by using the continuous gaze time, when the block identification (ID) of the block the user gazes at is changed during the continuous gaze time.

5. The apparatus of claim 3, wherein the zoom rate calculating unit calculates the zoom rate with respect to the zoom-in of the digital object when the continuous gaze time is greater than a predetermined threshold time.

6. The apparatus of claim 1, wherein the object navigation unit determines whether to navigate in the digital object based on at least one of an eye-blink included in the gaze information and a hand motion included in gesture information of the user.

7. The apparatus of claim 1, wherein:
    the information determining unit comprises a rendering quality calculator to calculate a rendering quality with respect to the digital object by using the gaze information and the gesture information; and
    the object navigation unit navigates in the digital object centering on a block the user gazes at, based on the rendering quality.

8. The apparatus of claim 7, wherein the rendering quality calculator calculates the rendering quality of the digital object based on a block identification (ID) of a block included in the gaze information and the continuous gaze time the user gazes at the block.

9. The apparatus of claim 8, wherein the rendering quality calculator performs one of:
    calculating of the rendering quality of the digital object by using the continuous gaze time, when the block identification (ID) of the block the user gazes at is the same during the continuous gaze time; and
    updating the digital object, when the block identification (ID) of the block the user gazes at is changed during the continuous gaze time.

10. The apparatus of claim 9, wherein, when the ID of the block the user gazes at is the same during the continuous gaze time, the rendering quality calculator increases the rendering quality of the block during the continuous gaze time and decreases the rendering quality around the block the user gazes at.

11. The apparatus of claim 9, wherein the rendering quality calculator sequentially decreases a rendering quality of a block adjacent to the block the user gazes at.

12. The apparatus of claim 1, wherein:
    the annotation intensity calculator calculates an intensity of the annotation with respect to the digital object by using the gaze information and the gesture information; and
    the object navigation unit outputs the annotation stored around a gaze location the user gazes at, based on the intensity of the annotation.

13. The apparatus of claim 12, wherein the annotation intensity calculator calculates the intensity of the annotation with respect to the digital object by using at least one of a distance between the annotation and the gaze location the user gazes at, a distance of the gaze location on a depth map, and a distance of the gaze location on a hit map that represents an interest of the user.

14. The apparatus of claim 1, wherein:
    the motion parallax calculator calculates three-dimensional (3D) location information and rotation information of the digital object by using the gaze information and the gesture information; and
    the object navigation unit navigates in the digital object based on the 3D location information and the rotation information centering on the gaze location the user gazes at.

15. The apparatus of claim 14, wherein the object navigation unit navigates in the digital object by changing an output location and an output angle of the digital object according to the location information and the gaze information of the user.

16. A method of navigating in a digital object, comprising:
    collecting gaze information and gesture information of a user with respect to a digital object that includes blocks;
    determining navigation information with respect to the digital object by using the collected gaze information and gesture information; and
    navigating in the digital object by using the digital object, wherein the method is performed using at least one processor, wherein the determining navigation information comprises calculating an intensity of an annotation with respect to the digital object or the determining navigation information comprises calculating a three dimensional (3D) location information and rotation information of the digital object.

17. The method of claim 16, wherein:
the determining navigation information comprises calculating a zoom rate with respect to the digital object by using the gaze information and gesture information; and
the navigating in the digital object comprises navigating in the digital object based on the zoom rate centering on a block the user gazes at.

18. The method of claim 17, wherein the calculating the zoom rate comprises calculating the zoom rate with respect to a zoom-in or a zoom-out of the digital object based on a block identification (ID) of a block included in the gaze information and a continuous gaze time the user gazes at the block.

19. The method of claim 16, wherein:
the determining navigation information comprises calculating a rendering quality with respect to the digital object by using the gaze information and the gesture information; and
the navigating in the digital object comprises centering on a block the user gazes at, based on the rendering quality.

20. The method of claim 19, wherein the calculating of the rendering quality comprises calculating the rendering quality of the digital object based on a block identification (ID) of the block included in the gaze information and the continuous gaze time the user gazes at the block.

21. The method of claim 16, wherein:
the determining navigation information comprises calculating the intensity of the annotation with respect to the digital object by using the gaze information and gesture information; and
the navigating in the digital object comprises outputting the annotation stored around the gaze location that the user gazes at, based on the intensity of the annotation.

22. The method of claim 21, wherein the calculating of the intensity comprises calculating the intensity of the annotation with respect to the digital object by using at least one of a distance between the annotation and the gaze location the user gazes at, a distance of the gaze location on a depth map, and a distance of the gaze location on a hit map that represents an interest of the user.

23. The method of claim 16, wherein:
the determining navigation information comprises calculating the three dimensional (3D) location information and rotation information of the digital object by using the gaze information and the gesture information; and
the navigating in the digital object comprises centering on the gaze location the user gazes at, based on the 3D location information and the rotation information.

24. The method of claim 23, wherein the navigating in the digital object comprises changing an output location and an output angle of the digital object according to the location information and the gaze information of the user.

25. A method of calculating a zoom rate or an information quality of a digital object comprising:
collecting gaze information and gesture information of a user;
enabling or disabling a navigation of the digital object based on the gesture information;
when the navigation of the digital object is enabled,
determining a current block based on the gaze information;
comparing the current block with a previous block;
when the current block is the same as the previous block, determining, based on a continuous gaze time, at least one of a zoom rate with respect to a zoom-in on the current block and an information quality of the current block;
when the current block is not the same as the previous block, determining at least one of a zoom rate with respect to a zoom-out from the previous block to the current block, the information quality of the current block, and an information quality of the previous block.

26. The method of claim 25, wherein the information quality of the current block comprises at least one of a rendering quality of the current block and an annotation intensity of the current block, and the information quality of the previous block comprises at least one of a rendering quality of the previous block and an annotation intensity of the previous block.

* * * * *